Oct. 27, 1959 W. D. BOLTON 2,910,229

DATA STORAGE DEVICE

Filed Dec. 31, 1956 5 Sheets-Sheet 1

INVENTOR.
WALLIS D. BOLTON
BY
J. Jancin Jr.
ATTORNEY.

Oct. 27, 1959 W. D. BOLTON 2,910,229

DATA STORAGE DEVICE

Filed Dec. 31, 1956 5 Sheets-Sheet 3

Oct. 27, 1959 W. D. BOLTON 2,910,229

DATA STORAGE DEVICE

Filed Dec. 31, 1956 5 Sheets-Sheet 4

Oct. 27, 1959

W. D. BOLTON

DATA STORAGE DEVICE 2,910,229

Filed Dec. 31, 1956

5 Sheets-Sheet 5

United States Patent Office 2,910,229

Patented Oct. 27, 1959

2,910,229

DATA STORAGE DEVICE

Wallis D. Bolton, Vestal, N.Y., assignor to International Business Machines Corporation, New York, N.Y., a corporation of New York Application December 31, 1956, Serial No. 631,876

6 Claims. (Cl. 235—61.11)

This invention relates to bistable magnetic devices for effecting a storage of information by coincident magnetic field and temperature switching thereof from one stable state to the other, and has for its broad object the provision of such a device.

Another object of this invention is to provide an improved high speed pulse transfer controlling device for governing the transfer of pulses from a source to a load.

The use of saturable ferromagnetic elements, such as magnetic cores for example, in static information storage devices and pulse transfer controlling devices, is well known. Furthermore, the favorable features afforded by these devices are also well recognized as is evident from their extensive use in a great variety of data handling and processing systems. Heretofore, however, the aforementioned elements in these devices have been switched from one stable state to the other solely by the application thereto of a coercive force which is of sufficient magnitude to drive the residual flux from one polarity to the other. As is well recognized by those persons skilled in the art, a sufficient coercive force to effect switching can be brought about by passing a magnitude of current through one or more windings that are magnetically associated with the ferromagnetic material which will produce the required magnetomotive force to effect the same. Thus a matrix type magnetic core register as is disclosed and claimed in the Weidenhammer Patent No. 2,708,267 which issued on May 10, 1955, requires one electrical means for impressing a so-called half-current on selected ones of designated core register row windings in addition to other electrical means for impressing a half-current on selected ones of core register column windings. Accordingly, only the single magnetic core at the intersection of two simultaneously energized row and column windings with which the said core is magnetically associated, is subjected to a "full current" coercive force sufficient to switch the core from one magnetic state to the other.

A preferred and illustrative embodiment of the present invention is also directed to the operation of a select one of a plurality of saturable magnetic cores constituting a magnetic core register. This is accomplished with the embodiment, however, through the use of a single electrical means for impressing a current which is comparable in magnitude to the aforesaid half-current, on selected ones of the core register row windings, for example, in coincidence with the operation of a heat producing means for raising the temperature of a selected column of cores in order to lower the coercivity of these cores to a value less than the coercive force produced by passage of the aforesaid current through the select core row windings.

Accordingly, another object of this invention is to provide an improved static information storage device.

Another object of this invention is to provide data storage apparatus for lowering the coercivity of a ferromagnetic element selectively and to a value less than the coercive force applied thereto.

Another preferred and illustrative embodiment of the present invention pertains to the use thereof in a record card reading device for sensing perforate data designations. Briefly stated, the operation of this device is dependent upon the accurate and timely response of the subject bistable magnetic device to the presence or absence of heat producing radiant energy as determined by the perforations in the record cards being scanned.

Accordingly, another object of this invention is to provide an improved perforate record reading device.

Other objects of this invention will be pointed out in the following description and claims and illustrated in the accompanying drawings, which disclose, by way of examples, the principle of the invention and the best mode, which has been contemplated, of applying that principle.

*General description*

Figure 1:
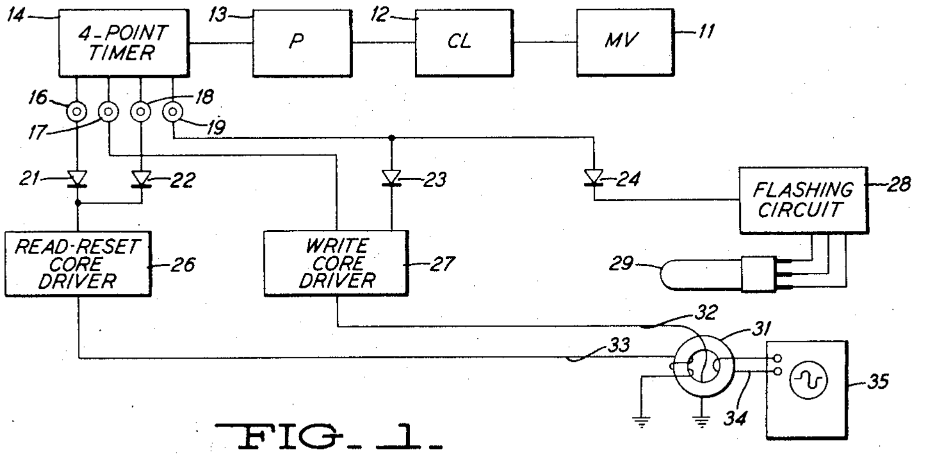
Fig. 1 illustrates one embodiment of a single bistable information storage device arranged to operate in accordance with the principles of the present invention.

The circuit arrangement shown in Fig. 1 wherein the present invention is embodied includes a multivibrator 11, a pulse clipper 12, a power amplifier 13 and a four-point timer 14, of the general type shown and described in the Dersch Patent No. 2,754,360 which issued on July 10, 1956. Thus, in response to each signal generated by multivibrator 11, a correspondingly timed signal is caused to appear at one of the output hubs 16—19 of the timer 14. These latter-mentioned signals appear sequentially on a successive one of the hubs 16—19 so that the first pulse signal "A" (see also Fig. 3) provided by timer 14 at hub 16, is applied for two milliseconds, for example, to the core driver read-reset apparatus 26 via diode 21. The next signal "B" of equal duration is applied to the core driver write apparatus 27 from hub 17. Subsequentially, the third signal "C" is directed from the timer hub 18 to the core driver read-reset apparatus 26 via diode 22, and the fourth signal "D" is then applied from hub 19 to the core drive write apparatus 27 via diode 23 as well as to the flashing circuit 28 via diode 24.

The core 31 of ferromagnetic material is shown in Fig. 1 to have three windings 32—34 thereon. The winding 32 is electrically associated with the core driver write apparatus 27 which is of a conventional design well known to persons skilled in this art and therefore requires no detailed description herein. The winding 33 is connected to the core driver read-reset apparatus 26 which also requires no further comment herein since it is of conventional design. The core output coil 34 is connected to any suitable electrical load, such as a commercially available oscilloscope 35 whereby all output signals may be viewed.

Figure 2:
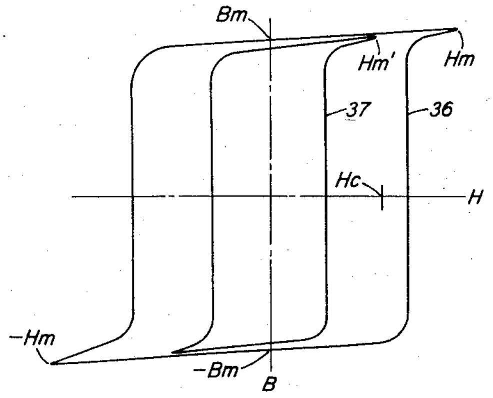
Fig. 2 illustrates a pair of hysteresis curves for a ferromagnetic material at two different temperatures.

*Hysteresis loops.*—A square wave hysteresis loop 36 is illustrated in Fig. 2 for the ferromagnetic material of core 31 (see also Fig. 1) when the core material is at ambient temperature. At this temperature the core material has a coercivity H*m*, which by the generally accepted definition is the coercive force required to magnetize the core material practically to saturation. At this temperature, the core material also has a retentivity B*m* which is indicative of the residual induction thereof at zero coercive force H consequent upon the material being magnetized practically to saturation. Of course, the polarity of the residual induction B is indicative of the state of the core residual magnetic flux density, and is determined by the polarity of the coercive force H applied to the core. Thus, if the core is set at a negative state of residual magnetic flux density, i.e., a value of —B*m*, and a positive coercive force H equal to the coercivity H*m*, for example, is applied to the core, the state of the negative residual magnetic flux density will be switched to a positive one. Furthermore, upon the removal of the positive coercive force H*m*, a residual induction whose value is B*m*, will remain so as to maintain the core material in a stable state of positive residual magnetic flux density. Similarly, the application of a negative coercive force —H equal to the coercivity —H*m*, for example, when the core is in a positive state of residual magnetic flux density, will cause the polarity thereof to be switched to a negative state. The residual induction that remains after the coercive force —H*m* is removed, is represented as —B*m*.

By raising the temperature of the core material in any suitable manner, such as by the radiant energy produced by flash tube 29 (Fig. 1) for example, the shape of the hysteresis loop for the core material will change from that shown as loop 36 at ambient temperature. Referring to Fig. 2, a smaller hysteresis loop 37 is shown to result from the application of heat energy to the core material. Accordingly, the coercivity H*m'* of the core material at the raised temperature is considerably less than the coercivity H*m* at the ambient temperature. As a result, it should be clear that the coercive force H required to switch the state of residual magnetic flux density of a magnetic material at the raised temperature, may be of a magnitude which of itself would be insufficient to magnetize the core material at ambient temperature to a desired state of residual magnetic flux density. Hence, it should also be clear that in such a case the residual inductance of the magnetic material may be switched only in response to this so-called insufficient coercive force in coincidence with the application of a required amount of heat energy thereto.

Figure 3:
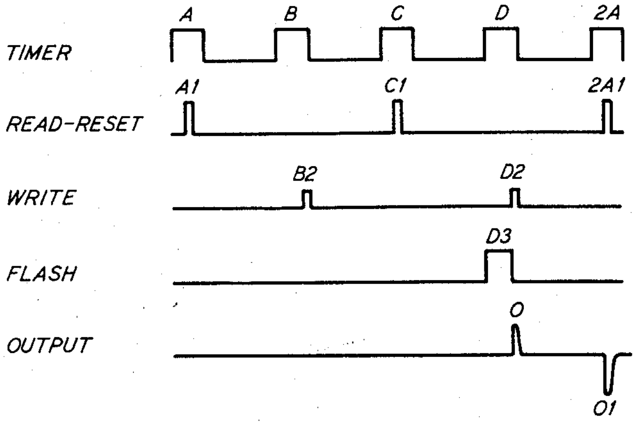
Fig. 3 is a timing chart of voltage signals as they appear at different points of the circuit arrangement shown in Fig. 1.

*Operation of the embodiment shown in Fig. 1.*—In operation, the application of the first signal, such as pulse "A" (see also Fig. 3) for example, to apparatus 26 causes a three microsecond read-reset pulse "A1" to be applied to coil winding 33. The resulting current flow through this winding is of a magnitude to produce a coercive force —H*m* (see also Fig. 2) which is sufficient to magnetize core 31 to a corresponding negative state of residual magnetic flux density. Thus, there will be a change in the residual magnetic flux density from one polarity to the other if the core material is at a positive residual induction prior to this current flow. It will be assumed, however, for the sake of discussion that the core material was initially set at a negative residual inductance. The next following application of the "B" signal from hub 17 of timer 14 onto the write apparatus 27, causes a corresponding current flow through coil 32 as is depicted by the three microsecond write signal "B2." The current flow through winding 32, however, is of a magnitude to produce a coercive force H*c* which is of insufficient magnitude to magnetize core 31 to an assigned write state wherein the residual magnetic flux density is positive. Thus, even though the core at this time is in the negative reset state due to the application thereto of a preceding read-reset signal "A1," the residual inductance of the core will not be switched, and accordingly, there will not be a signal generated in output winding 34. The third timer output signal "C" at hub 18 causes a pulse "C1" to be applied to the winding 33, which said pulse is of the same magnitude and duration as the previously discussed pulse "A1," and in fact has the same effect on the state of the residual magnetic flux density of the core. The application of the fourth timer output signal pulse "D" to both of the apparatuses 27 and 28, causes the afore-mentioned coercive force H*c* to be produced by the current flow through winding 32 simultaneously with the application on core 31 of radiant energy from the now energized flash tube 29. The effect of this radiant energy on core 31 is to raise the temperature of the magnetic core material sufficiently above the ambient temperature so as to lower the coercivity of the core material (see also Fig. 2) to a value, e.g., H*m'*, which is less than the coercive force H*c* produced by the current flow through winding 32. This simultaneous action whereby the core coercivity is lowered from a value H*m* to a value H*m'* which as stated previously is less than the current produced coercive force H*c* due to signal pulse "D2," causes the magnetic core to be switched from a negative residual inductance to a positive state of residual magnetic flux density. The radiant energy flash itself is represented in Fig. 3 by the one hundred to two hundred microsecond pulse identified as "D3." Since the residual inductance of the core is switched from a negative state to a positive one at "D" time, a positive going output signal "O" will appear across winding 34. Similarly, since the magnitude of the coercive force produced by the signal pulse "2A1" which is similar to the prior pulse "A1," is sufficient to magnetize the core at ambient temperature to a negative residual inductance, a negative signal "O1" will appear across winding 34 at "2A" time.

It might be well to also mention at this time a substitute heat producing arrangement for the flash tube. This arrangement would include an incandescent lamp 29*a* (Fig. 4), such as a sixty-two watt commercially available type GE–941 lamp, so spaced from core 31*a* that the filament image is focused thereon. The lamp is caused to be energized continuously by a power supply 30*a*, but is ineffective to heat the core 31*a* in view of an electromagnetic shutter 25*a* between the core and the lamp. In response to the application of a suitable signal, such as signal "D" (see also Fig. 3) for example, to diode 24*a*, a corresponding signal is applied to the shutter 25*a* via a single-shot multivibrator 15*a* and power apparatus 20*a*. Thus, the core is subjected to the radiant energy being emitted by the lamp 29*a* since the signal to shutter 25*a* causes the same to be opened for the duration of the signal. The use of this lamp 29*a* in place of the flash tube 29 (Fig. 1) would appear to afford a slower operating storage device in view of results realized with the aforesaid type GE–941 lamp 29*a* (Fig. 4) which made it necessary to have a core exposure time of approximately forty milliseconds. Of course, the timer 14 (see also Fig. 1) would have to be adjusted to provide proper signals to the apparatus associated with core 31*a*.

Figure 4:
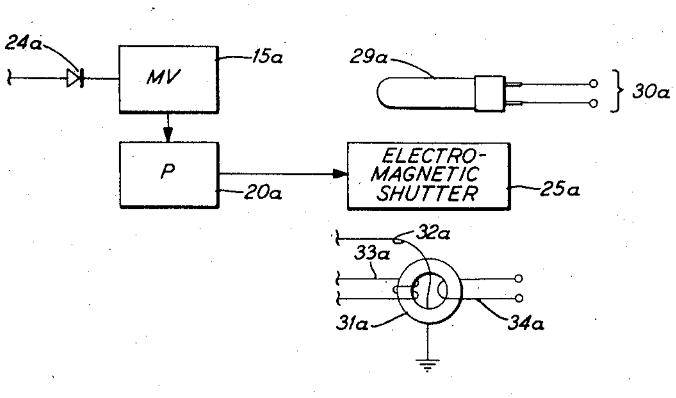
Fig. 4 illustrates another embodiment of a single bistable information storage device.

Thus, it may be stated in summation that the arrangements shown in Figs. 1 and 4 are each such that the polarity of the ferromagnetic core residual magnetic flux density is not affected by either a current flow through winding 32 as caused by signals "B2" and "D2," or the application of heat energy from any source, e.g., flash tube 29, onto core 31, but is responsive only to the coincidence of these two afore-stated electromagnetic and thermal energy producing actions.

Figure 6:
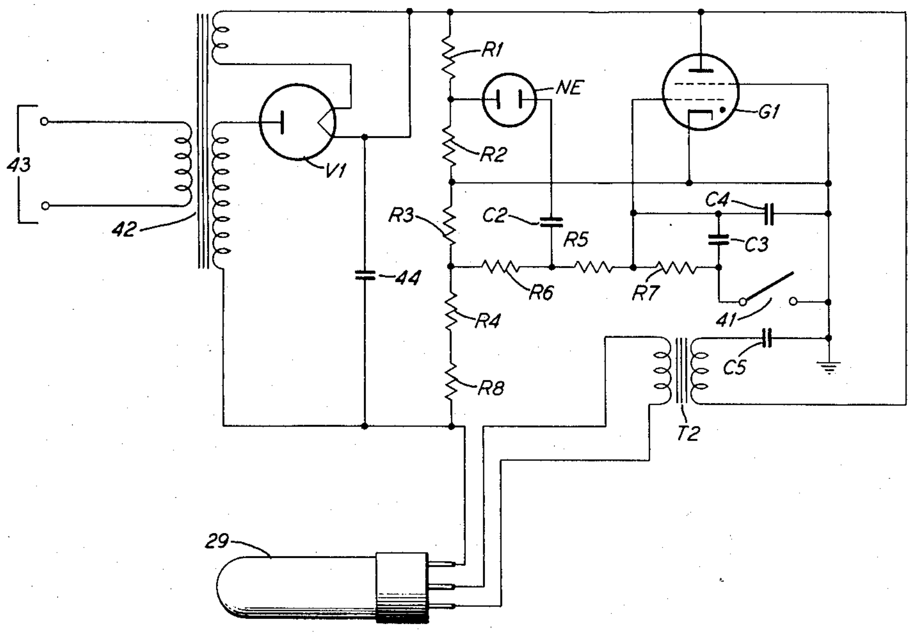
Fig. 6 is a wiring diagram of a flashing circuit for energizing the heat energy producing flash tubes used in illustrative embodiments of the present invention.

*Flash tube energizing circuit.*—The arrangement shown in Fig. 1 employs a flash tube 29 which could be a commercially available GE type FT–214 or type FT–403 flash tube, for example. As stated previously, this tube provides a radiant energy for raising the temperature of the core material. Referring to Fig. 6, the flash tube 29 is caused to be energized whenever switch 41 is closed. This switch as shown is merely representative of one that can be closed by any one of a number of well-known high speed switching devices which would be operated in response to the application thereto of a signal, such as pulse "D3" (Fig. 3) for example.

The circuit diagram shown in Fig. 6 provides a flash tube operating potential of approximately 2000 volts. The primary winding of transformer 42 may be connected to a conventional 110 volt A.C. power supply 43, whereupon approximately 1400 volts will be impressed across the secondary winding of transformer 42 which is connected to the anode of tube V1. Thus, the peak voltage value that is applied across condenser 44 is in the neighborhood of 2000 volts, so that consequent upon the operation of switch 41, gas tube G1, preferably a type 2050 thyratron tube, is caused to ignite and thereupon energize flash tube 29.

Figure 7:
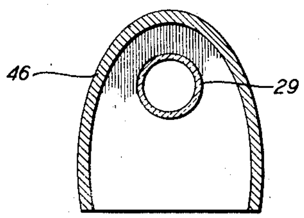
Fig. 7 is a cross-sectional view of an elliptical reflector adaptable for use with the radiant energy producing tubes.

The flash tube 29 as well as tube 29a (Fig. 4), should preferably be arranged within a focusing reflective housing, such as the elliptical housing 46 (Fig. 7) for example. This housing and lamp 29 are so arranged that the radiant energy emitted from the lamp and reflected by the housing is focused directly onto the material, such as core 31 (Fig. 1) for example, whose temperature is to be raised. Thus, the temperature of the material, whereon the radiant energy is focused, is raised rapidly and within a minimum period of elapsed time.

*Operation of apparatus embodying present invention.*—The present invention will presently be shown and described as adapted for use in a magnetic core matrix register and a perforate record reading device. These illustrative and preferred embodiments are to be considered as being simply illustrative and not restrictive, since features of the present invention may be applied to other structural arrangements without departing from the spirit of the invention.

Figure 5:
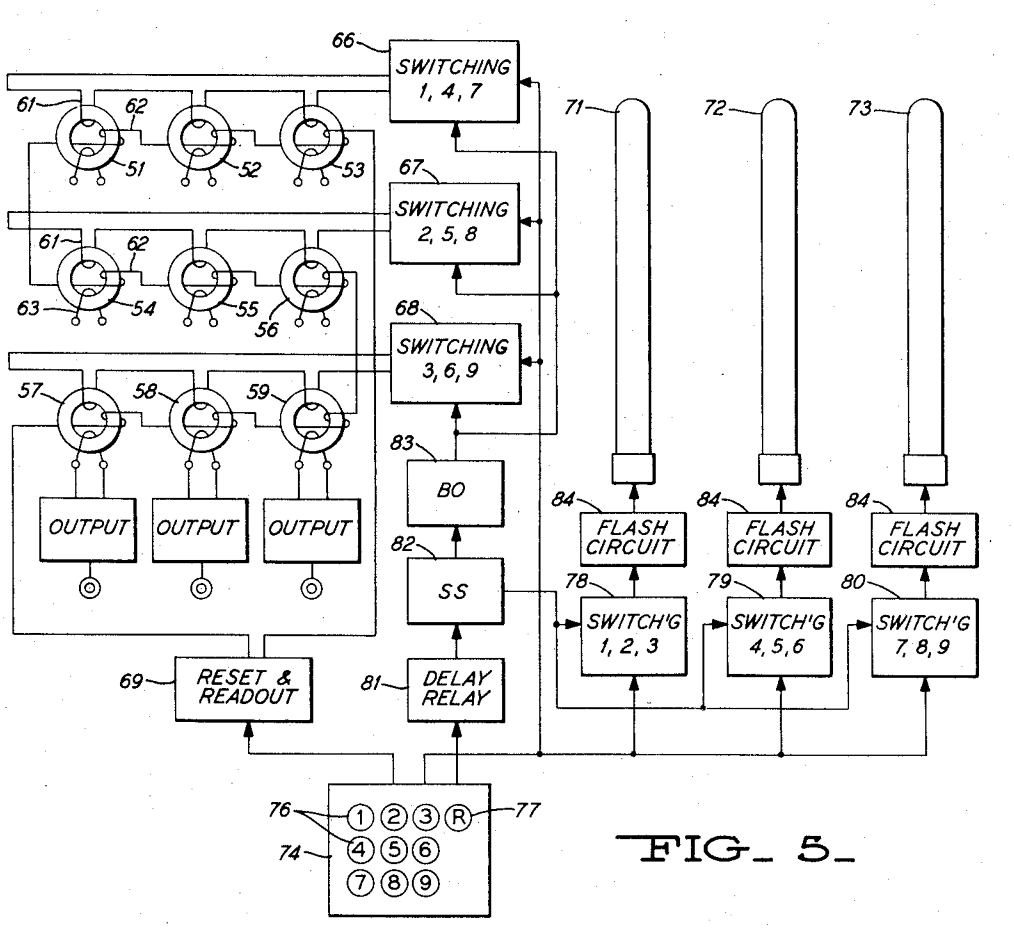
Fig. 5 illustrates a magnetic core static register wherein the present invention is embodied.

*Magnetic core matrix register.*—A register of nine cores 51–59 is shown in Fig. 5 to be arranged in three horizontal rows and three vertical columns. Each core has three windings thereon; namely, a write winding 61, a read-reset winding 62 and an output winding 63. Each of the write windings 61 associated with a row of cores, e.g., cores 51—53, is caused to be connected in series circuit with a core driver write blocking oscillator 83 via one of the relay switching apparatuses 66—68. On the other hand, each of the read-reset windings 62 associated with all of the cores 51–59, is connected in series circuit across the core driver read-reset apparatus 69. A respective flash tube 71—73 is operatively associated with a different one of the three columns of cores, so that flash tube 71, for example, projects the radiant energy produced therein when energized onto the column of cores 51, 54 and 57.

A keyboard 74 having nine numeric digit-representing keys 76 and a single reset key 77, is manually operated to effect the operation of certain relays (not shown) in response to the depression of any one of the keys. These relays operate their respective contacts which are represented in Fig. 5 by the blocks 66—68 and 78—80 and which are arranged in a well-known manner in order to coincidently effect the energization of a single select row of write windings 61 and a single select columnar flash tube 71—73. In other words, the relay switching circuits 66—68 and 78—80 are used to simply provide a gating means for permitting the transmission of a signal therethrough from a suitable source to a load.

There are also provided in the arrangement shown in Fig. 5, a delay relay 81 which is energized concurrently with the energization of any one of the afore-mentioned switching relays (not shown) when a key 76 is depressed, a single-shot multivibrator 82 which is of conventional design, and a blocking oscillator 83 also of conventional design. In addition to the foregoing, there is also interposed between each of the flash tubes 71—73 and their respective relay switching gates 78—80, a flashing circuit 84 which is similar in all respects to the one previously described with regard to Fig. 6.

In operation, a numeric digit key 76, such as the one representing the value two for example, is depressed, whereupon a corresponding switching relay (not shown) is energized concurrently with the energization of delay relay 81. The immediate operation of the so-called two-digit value switching relay effects the operation of respective contacts which, in turn, cause the relay switching gates 67 and 78 to be conductive. The delay relay 81 does not operate immediately but, in fact, after the operation of a switching relay so as to cause a suitable signal to be applied to the single-shot multivibrator 82. As a result, this latter-mentioned device, in turn, applies suitable signals concurrently to the blocking oscillator 83 and the gates 78—80. Since only gate 78 of the latter-mentioned group has been rendered conductive, the signal from the multivibrator 82 will be effective to energize only the flash tube 71. Similarly, the signal output from blocking oscillator 83 which is applied simultaneously to the relay gates 66—68 of which only gate 67 has been operated, will be effective to energize the second row of write coils 61 associated with the gate 67. Hence, in response to the energization of flash tube 71 whose radiant energy output causes coercivity of cores 51, 54 and 57 to be lowered, and the coincident energization of the second row of write coils 61 associated with cores 54—56, only the state of the residual magnetic flux density of the two-digit value core 54 will be changed. In line with what has been brought out previously, it should be clear by this time that this result is produced by the effect of the heat on the core material to lower the coercivity thereof to a value less than the coercive force produced by the current flow through a write winding 61. Thus, a two-digit value will be stored in the core register due to this change in the state of residual magnetic flux density of the core 54. This may be read out at any time by the depression of the read-reset key 77, to thereupon render the core driver read-reset apparatus 69 effective to energize all of the series connected read-reset windings 62. Since only the state of the residual magnetic flux density of core 54 has been changed by the depression of the two-digit value key 76, this will be the only core whose residual magnetic flux density will be changed once again due to the magnitude of current flow through its respective winding 62 which is sufficient to magnetize the core. Accordingly, a corresponding two-digit value representing signal will be generated in only output coil 63 of core 54.

It should also be clear that an arrangement similar to the one shown in Fig. 4 could be incorporated with that of Fig. 5.

*Perforate record reading device.*—This embodiment is directed to the use of a novel record card data sensing apparatus which can be used to govern the operation of a record card punching and duplicating machine of the type disclosed in the Lee et al. Patent No. 1,976,618 which issued on October 9, 1934. As stated previously, this embodiment should be considered as simply an illustrative one since features of the present invention may be applied to other forms of perforate record controlled machines without departing from the spirit of the invention.

Briefly described, the afore-mentioned Lee et al. machine is one which includes a stationary punching mechanism for recording columnar record card data, a master record card data reading station, and an intermittently advancing carriage for moving a master card in step with a detail card column-by-column past their respective record card operating instrumentalities. Thus, the data recorded in the master card is caused to be recorded in the detail card being moved therewith as the punching mechanism is operated in response to the reading of the columnar data in the master card which, as stated previously, is effected by the embodiment of the present invention. The electrical circuits shown in Fig. 10 which per se do not form a part of the present invention, will now be described briefly. A transformer 116 is connected across the A.C. power supply 117 to supply the cathode heaters 118 of the gas tubes G2 and G3. A suitable negative bias is applied to the control grids 119 from the output side of the transformer through a rectifier 121, variable resistor 122 and resistors 123 to maintain the gas tubes in a nonconducting state. As stated previously, when a perforation is encountered in the record card, a magnet 108 will be operated to close contacts 124, whereupon the common punch mechanism operating magnet 126 will be operated. The normally open pair of contacts 127 are closed when the rack 96 (see also Fig. 8) is moved beyond the last record card column, to thereby effect the operation of a motor 128 which drives the rack back to its home starting point. A so-called trip magnet 129 is energized in response to the aforesaid rack being moved beyond the last columnar position of a record card. The operation of this magnet 129 is simply to remove each of the detail cards from their respective carriage support after the card has been completely punched.

Figure 9:
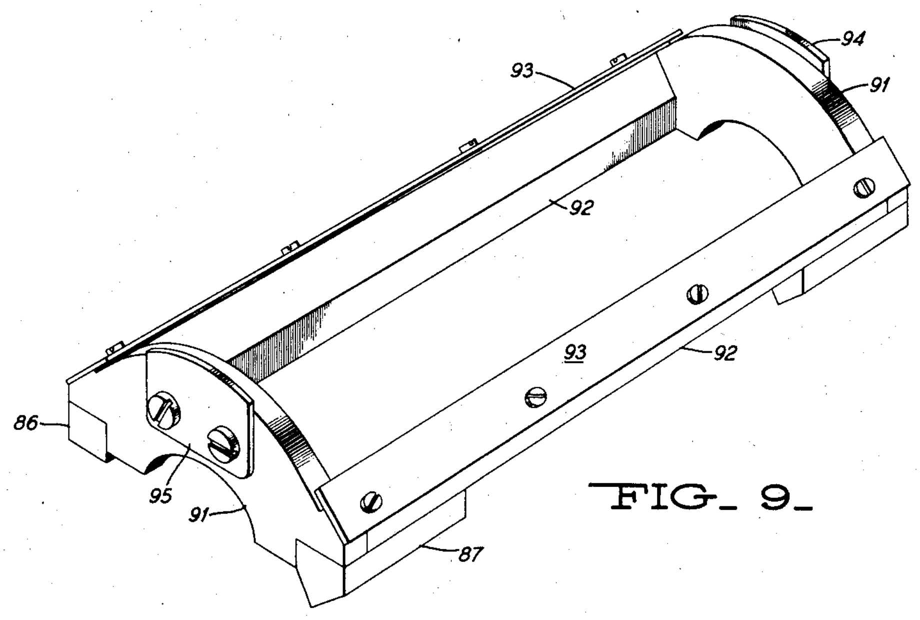
Fig. 9 is a perspective view of the carriage for moving a record card past the perforation sensing elements shown in Fig. 8.

The master record card holder which is a part of the step-by-step, i.e., column-by-column, moving carriage, is shown in Fig. 9 to be comprised of a pair of arcuate end members 91 that are joined by the cross members 92. These cross members support the plates 93 which are fastened to the top of the cross members 92 so as to overlap slightly a portion of the end members 91. It can be readily seen that a record card, such as the well-known IBM record card for example, may be placed within the mechanism shown in Fig. 9 by inserting the edges of the card underneath the plates 93, and may be retained securely by the right and left guide members 94 and 95. By virtue of these plates, the record card is bowed to conform to the arcuate end members 91.

Figure 8:
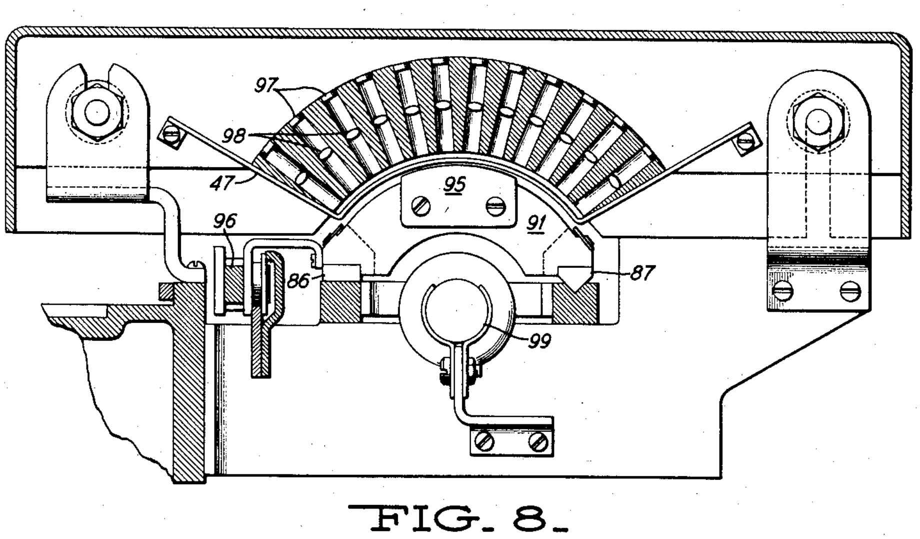
Fig. 8 illustrates the general arrangement of a record card reading device embodying the present invention.

The card support mechanism, shown in Fig. 9, is mounted on a columnar step-by-step movable carriage of the general type shown and described in the afore-mentioned Lee et al. patent. As stated previously, this carriage causes the master record card to be moved past the sensing elements shown in Fig. 8 and to be described shortly. As shown therein, the carriage is attached to a rack 96 which is advanced by the usual tooth engaging dog and escapement devices. This perforate record card sensing station includes a ferromagnetic element 97, e. g., a saturable core, and a radiant energy focusing lens 98 for each of the twelve record card index points. Furthermore, each of the elements 97 and 98 is so arranged with respect to a radiant energy producing tube 99 that the ferromagnetic elements 97 and the lenses 98 lie along concentric circles in a plane which passes through tube 99, said circles having the position of tube 99 as their center. Thus, the radial distance from the filament of the radiant energy producing tube 99 to any optical lens 98 is a fixed value, as, of course, is the distance from the aforesaid filament to any ferromagnetic element 97. As is shown in Fig. 8, a suitable framework is provided to support the elements 97 and 98 as well as the tube 99.

Figure 10:
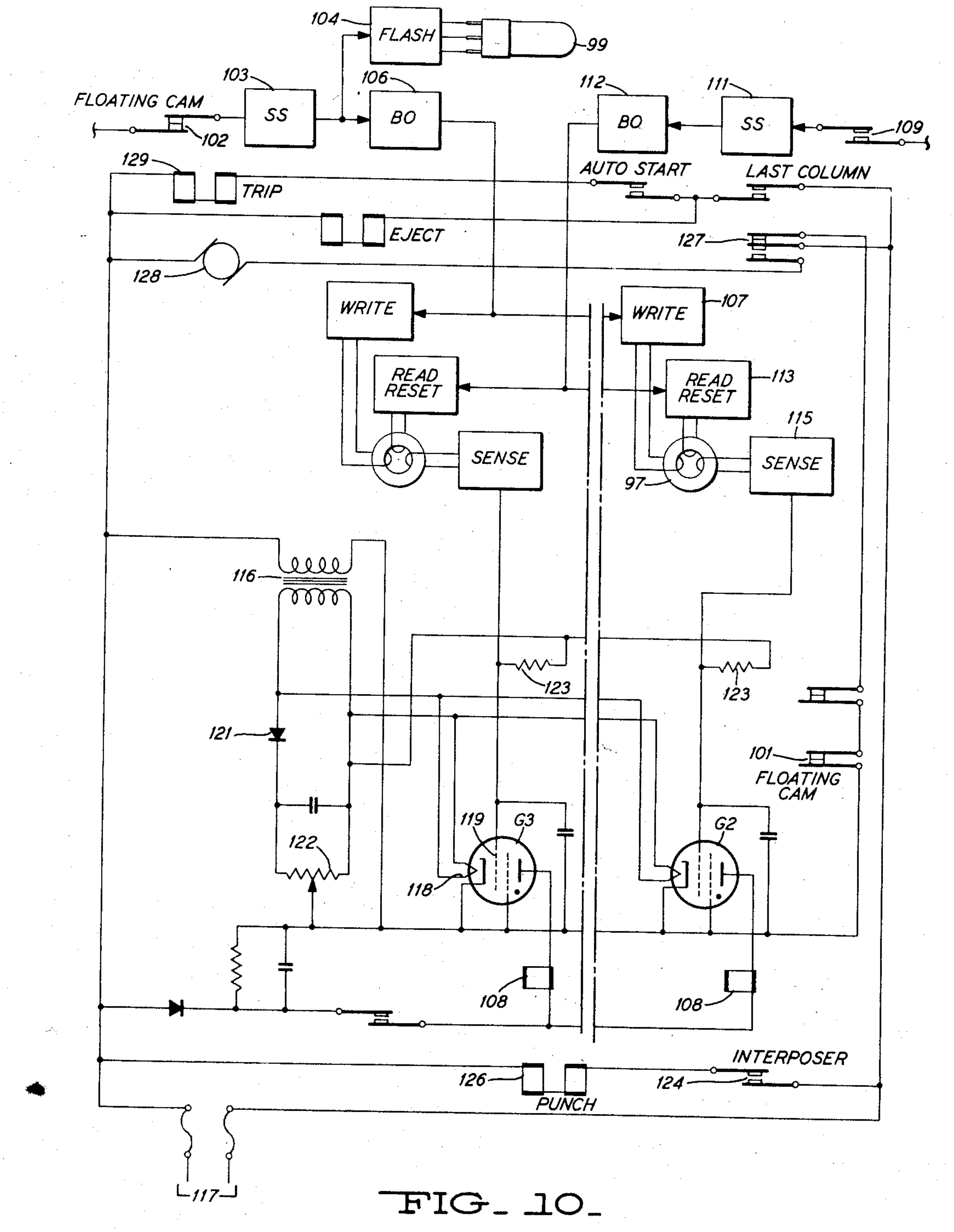
Fig. 10 is a wiring diagram of a record card punching and duplicating machine in which the perforation sensing elements embodying the present invention are incorporated.

Referring to Fig. 10, when a data indicating perforation is presented to the sensing station by the master card supported by its holding mechanism of Fig. 9, a beam of radiant energy is caused to be directed from the tube 99 to a perforation corresponding ferromagnetic element 97. At this same time, an electrical circuit to be described shortly is completed to cause a current flow through a respective write winding associated with each of the elements 97, but which current is of a magnitude insufficient to produce a coercive force that will change the residual induction of a ferromagnetic element at ambient temperature. However, the current is of such magnitude as to produce a coercive force which is greater than the coercivity of the particular one or more ferromagnetic elements 97 having incident radiant energy from tube 99 thereon.

The operation of the circuit shown in Fig. 10 need be described only briefly herein. As the carriage is moved step-by-step, or actually column-by-column past the perforate data sensing station, the normally closed floating cam contacts 101 and 102 are caused to open before the carriage is escaped to the next column, and are caused to close consequent upon the carriage having been moved to the next column. The closure of cam contacts 102 causes the operation of a single-shot multivibrator 103 which, in turn, causes the energization of the tube 99 via the energizing circuit 104. Concurrently with the application of a signal from multivibrator 103 to circuit 104, a signal is applied to the blocking oscillator 106 which causes a core driver write apparatus to produce a current flow through all of the series connected write windings associated with the ferromagnetic elements 97. Thus, in response to a coincident temperature increase of a ferromagnetic material which is aligned with an index point perforation, along with a write coil current flow, the particular ferromagnetic element involved will be switched from one stable state to the other. Thereupon, an output signal is caused to be applied to the control grid of a gas tube G2 so as to fire the same and thereby cause the energization of its related punch duplicating magnet 108. This, of course, will cause the operation of a corresponding duplicating punch mechanism (not shown) as is described in the afore-mentioned Lee et al. patent, for producing a similar index point perforation in the detail record card.

Operation of the magnet 108 will, as an incident to the punching operation, cause the floating cam contacts 101 and 102 to open before the carriage is escaped to the next column. As a result, the plate circuits of the gas discharge tubes G2—G3 shown will be opened and the tubes will be restored to the nonconducting state before the next column of the card is in position to be sensed. At the same time that the floating cam contacts 101 and 102 are opened, the normally open floating cam contacts 109 are closed to cause the operation of the single-shot multivibrator 111 and the blocking oscillator 112. A resulting output signal from oscillator 112 will cause the core driver reset apparatus 113 to apply a suitable signal to the reset coils associated with each of the ferromagnetic devices 97, in order to reset the residual induction of all of the ferromagnetic elements prior to the time that the next column of the record card is in position to be sensed.

With the radiant energy producing lamp 99 (Fig. 8) an intermittently energized one, a radiant energy shield 47 is provided. This is in the form of a solid plate with a bowed portion having a curvature resembling that of the top of the arcuate block shown in Fig. 9. The end portions of the shield extend upwardly and outwardly, and are so fastened to the machine frame that a row of twelve holes (not shown) is centrally located with respect to each column of a master card in analyzing position. As the said card is fed column-by-column underneath shield 47, each card column will be successively positioned directly under the holes thereof to permit the radiant energy from source 99 to be transmitted to the elements 97 for that particular column while radiant energy from perforations in all other card columns will be blocked by the solid portion of the shield.

Should the radiant energy source 99 be a continuously energized one in keeping with the arrangement described with regard to Fig. 4, an electromagnetically operated shutter (not shown) would be used with shield 47 (Fig. 8). The operation of this mechanism would be such that normally the row of twelve holes in the shield would be closed. In response to the card carriage being moved to a succeeding column, the electromagnetically operated shutter (not shown) would be moved so as to maintain the aforesaid twelve shield holes open for a predetermined period of time. Accordingly, one or more of the elements 97 would be exposed to radiant energy passing through corresponding card perforations.

*Summary.*—As has been brought out hereinbefore, the broad aspects of the present invention relate to a structural arrangement whereby the temperature of a saturable ferromagnetic element is raised sufficiently to lower the coercivity of the said ferromagnetic element to a value below the magnitude of an applied coercive force which of itself is insufficient to magnetize the ferromagnetic element to a desired state of residual magnetic flux density at ambient temperature. This principle has been applied to several different embodiments to point up the broad application of the present invention. Accordingly, while there have been shown and described and pointed out the fundamental novel features of the invention as applied to a preferred and illustrative embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In combination, a plurality of ferromagnetic material elements each having a coercivity H*m* at ambient temperature, a corresponding plurality of magnetizing windings, one for each of said elements, on respective ones of said elements, electrical means for connecting said plurality of magnetizing windings in series circuit, other electrical means connected to said series circuit windings for impressing thereon a current of such magnitude so as to produce in each of said elements a coercive force H*m'* which is less than H*m* and is insufficient to set any of said elements at ambient temperature to a desired state of residual flux density, and heat producing means for raising the temperature of a selected one of said elements sufficiently above the ambient temperature so as to lower the coercivity of said selected element to a value less than H*m'* whereby the selected one of said elements alone is caused to be set to the desired state of residual magnetic flux density by its respective coercive force H*m'* produced by said current.

2. A device of the class described for analyzing records selectively perforated in columns of index point positions comprising a radiant energy source, a group of saturable magnetic material elements each having a coercivity H*m* at ambient temperature, one for each index point position of the record columns, a corresponding plurality of magnetizing windings, one for each of said elements, on respective ones thereof, means supporting said elements in an arc centered at said radiant energy source, means operative to pass the record column-by-column between said radiant energy source and said elements, said last means comprising a carriage having an arcuate bed to hold the record in an arc concentrically positioned between said radiant energy source and said elements, electrical circuit means for connecting said plurality of windings in series circuit, other electrical circuit means connected to said series circuit windings for impressing thereon a current of such magnitude as to produce in each of said elements a coercive force H*m'* which is less than H*m* and is insufficient to set a respective one of said elements at ambient temperature to a desired state of residual magnetic flux density, an electrical load circuit, a plurality of output sensing windings each of which is on a respective one of said elements and each of which is connected to said load circuit, and shielding means enclosing said group of elements and having a surface along which the record is moved, said surface being apertured along one column of index point positions of the record, to admit radiant energy from any perforated index point position coming into register with said apertured portion of said enclosing means to the corresponding one of said elements so as to raise the temperature of said corresponding element above the ambient temperature and to lower the coercivity thereof to a value less than H*m'*, whereby said corresponding element is set by the coercive force H*m'* to the desired state of residual magnetic flux density and a pulse of current is impressed on said load circuit from said output winding on said corresponding element.

3. A device for analyzing records selectively perforated in columns of index point positions comprising a source of radiant energy, a group of saturable magnetic cores, one for each index point position of the record columns, each of said cores having a coercivity H*m* at ambient temperature, means supporting said cores along a single column of a record, means for passing the record column-by-column between said radiant energy source and said cores, a plurality of magnetizing windings, one for each of said cores, on respective ones of said cores, electrical circuit means for connecting said plurality of windings in series circuit, other electrical circuit means connected to said series circuit windings for impressing thereon a current of such magnitude as to produce in each of said cores a coercive force H*m'* which is less than H*m* and is insufficient to set any of said cores at ambient temperature to a desired state of residual magnetic flux density, an electrical load circuit, a plurality of output sensing windings, each of which is wound on a respective one of said cores and each of which is connected to said electrical load circuit, means for operatively connecting said radiant energy source and each of said cores by forming an image of said radiant energy source on each of said cores and shielding means enclosing said group of cores and having a surface along which the record is moved, said surface being apertured along one column of index point positions of the record to admit radiant energy from said source through any perforated index point position coming into register with said apertured portion of said enclosing means to a corresponding one of said cores so as to raise the temperature of said corresponding core sufficiently above the ambient temperature and to lower the coercivity thereof to a value less than H*m'*, whereby said corresponding core is set by the coercive force H*m'* to the desired state of residual magnetic flux density and a signal is impressed from said output winding thereof on said electrical load circuit.

4. A device according to claim 3 additionally comprising a plurality of discharge windings, one for each of said group of cores, on respective ones of said cores, pulse generator means for producing at least a single pulse of current of such magnitude as to produce in each of said cores a coercive force H*m* which is sufficient to set each of said cores to the other state of residual magnetic flux density when the current is impressed on each of said discharge windings, and means governed by said column-by-column record moving means for connecting said pulse generator means to each of said discharge windings simultaneously while said carriage is being moved from one columnar position to the next.

5. A magnetic core register comprising a plurality of saturable magnetic cores arranged in a matrix of rows and columns, each of said cores being composed of ferromagnetic material having a coercivity H*m* at ambient temperature, common core magnetizing windings connecting the cores of each row, electrical circuit means for impressing on selective ones of said windings a current of such magnitude as to produce in corresponding ones of said cores a coercive force H*m'* which is less than H*m* and is insufficient to set a core at ambient temperature to a desired state of residual magnetic flux density, sensing windings on each of said cores, and heat producing means effective at a time coincident with the impression of current upon the selected ones of said windings for raising the temperature of a select column of cores above the ambient temperature so as to lower the coercivity of each of said selected cores to a value less than H*m'*, whereby an output pulse is generated on the one of said sensing windings associated with the one of said cores set by a coercive force H*m'* to the desired state of residual magnetic flux density.

6. Apparatus for analyzing a record element having data thereon in the form of selectively positioned indicia transparent to radiant energy comprising a saturable magnetic element capable of assuming first and second states of magnetic retentivity and having a coercivity H*m* at ambient temperature, a magnetizing winding on said magnetic element, electrical means connected to said winding for impressing a current thereon of such magnitude as to produce a coercive force H*m'* which is less than H*m* and is insufficient to alter the state of retentivity of said element at ambient temperature, radiant energy producing means, and means operative to pass said record element between said radiant energy producing means and said magnetic element for selectively modulating the temperature of said magnetic element above ambient so as to lower the coercivity of said element to a value less than H*m'* whereby the coercive force H*m'* causes said element to be altered from said first to said second state of retentivity in accordance with said transparent indicia.

References Cited in the file of this patent

UNITED STATES PATENTS 2,776,419 Rajchman et al. -------- Jan. 1, 1957

OTHER REFERENCES

"Magnetic Materials," F. Brailsford, published by John Wiley & Sons (New York), 1951 (pages 78–9 relied on).